United States Patent
Omura et al.

(10) Patent No.: US 12,195,407 B2
(45) Date of Patent: Jan. 14, 2025

(54) PROCESS FOR REFORMING THE FLY ASH

(71) Applicant: TOKUYAMA CORPORATION, Shunan (JP)

(72) Inventors: Kohei Omura, Shunan (JP); Takuya Seki, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 1015 days.

(21) Appl. No.: 16/972,139

(22) PCT Filed: Feb. 13, 2020

(86) PCT No.: PCT/JP2020/005521
§ 371 (c)(1),
(2) Date: Dec. 4, 2020

(87) PCT Pub. No.: WO2020/189109
PCT Pub. Date: Sep. 24, 2020

(65) Prior Publication Data
US 2021/0238089 A1 Aug. 5, 2021

(30) Foreign Application Priority Data
Mar. 18, 2019 (JP) ................................ 2019-050270

(51) Int. Cl.
*C04B 7/26* (2006.01)
*B07B 7/00* (2006.01)
(Continued)

(52) U.S. Cl.
CPC .................. *C04B 7/26* (2013.01); *B07B 9/00* (2013.01); *B09B 3/25* (2022.01); *B09B 3/40* (2022.01);
(Continued)

(58) Field of Classification Search
None
See application file for complete search history.

(56) References Cited

U.S. PATENT DOCUMENTS

| | | | |
|---|---|---|---|
| 5,996,808 A | 12/1999 | Levy et al. | |
| 2004/0123786 A1* | 7/2004 | Crafton | F23J 15/02 110/346 |

(Continued)

FOREIGN PATENT DOCUMENTS

| | | | |
|---|---|---|---|
| JP | 58-85011 A | 5/1983 | |
| JP | 7-155740 A | 6/1995 | |

(Continued)

OTHER PUBLICATIONS

Machine Translation of JP 2000213709 (Year: 2000).*

(Continued)

*Primary Examiner* — Michael Forrest
(74) *Attorney, Agent, or Firm* — Birch, Stewart, Kolasch & Birch, LLP

(57) ABSTRACT

A process for reforming the fly ash by heating a raw fly ash powder that contains the unburned carbon and thereby decreasing the content of the unburned carbon, characterized in that (a) as means for heating the raw fly ash powder, use is made of a heating unit that heats the raw fly ash powder by passing it through a heated medium-fluidized bed, (b) a high-temperature gas stream is passed through the heating unit to form the heated medium-fluidized bed and to fluidize and convey the raw fly ash powder that is thrown into the medium-fluidized bed, (c) the flow rate of the high-temperature gas stream is so set that the raw fly ash powder thrown into the heating unit is all heated in the medium-fluidized bed and is taken out from a take-out port provided at an upper part of the heating unit but that the particulate medium forming the medium-fluidized bed is not discharged from the take-out port, (d) the fly ash powder after heated and (Continued)

discharged from the take-out port of the heating unit is introduced into an air classifier where it is separated into a fine powder and a coarse powder, (e) the fine powder separated by the air classifier is recovered as the reformed fly ash, and (f) the coarse powder separated by the air classifier is measured for its content of the unburned carbon and when the measured value is larger than a predetermined threshold value, the coarse powder is introduced again into the heating unit so as to be heated again and when the measured value is smaller than the threshold value, the powder is recovered as the reformed fly ash.

4 Claims, 2 Drawing Sheets

(51) Int. Cl.
  *B07B 9/00* (2006.01)
  *B09B 3/25* (2022.01)
  *B09B 3/40* (2022.01)
  *B09B 101/30* (2022.01)
  *C04B 7/43* (2006.01)
  *C04B 7/45* (2006.01)
(52) U.S. Cl.
  CPC ............... *C04B 7/438* (2013.01); *C04B 7/45* (2013.01); *B07B 7/00* (2013.01); *B09B 2101/30* (2022.01)

(56) References Cited

U.S. PATENT DOCUMENTS

2006/0283355 A1* 12/2006 Knowles .................. F23G 5/32
                                                              106/405
2019/0233331 A1*  8/2019 Omura .................... C04B 28/04
2020/0010362 A1    1/2020 Omura et al.

FOREIGN PATENT DOCUMENTS

| JP | 2000-213709 A | 8/2000 | |
| JP | 3205770 B2 | 9/2001 | |
| JP | 6038548 B2 | 12/2016 | |
| JP | 2017-148762 A | 8/2017 | |
| JP | 2019-107619 A | 7/2019 | |
| JP | 2019-107620 A | 7/2019 | |
| WO | WO-2018008513 A1 * | 1/2018 | ............... B09B 5/00 |
| WO | WO 2018/180680 A1 | 10/2018 | |

OTHER PUBLICATIONS

International Search Report, issued in PCT/JP2020/005521, dated Mar. 31, 2020.

Chinese Office Action and Search Report for corresponding Chinese Application No. 202080017736.3, dated May 26, 2022, with a partial English translation.

* cited by examiner

PROCESS FOR REFORMING THE FLY ASH

TECHNICAL FIELD

This invention relates to a process for reforming the fly ash by decreasing the content of the unburned carbon in the fly ash.

BACKGROUND ART

When the fly ash is used as a material to be mixed into the cement or as a material to be mixed into the concrete (hereinafter mixing material), it is, usually, desired that the content of the unburned carbon in the fly ash is better smaller.

In general, however, the fly ash generated from the coal burning thermal power plant contains the unburned carbon in various amounts, say, about 15% by mass at the greatest. Therefore, only some of the fly ash can be used as the mixing material.

There have been proposed various methods of decreasing the amount of the unburned carbon in the fly ash, such as a combustion method utilizing the combustibility of the unburned carbon, a classification method utilizing the sizes of the particles and a difference in the density thereof, and an electrostatic separation method utilizing the polarity of the electric charge of the particles.

For example, the combustion method includes a method that uses a rotary kiln (patent document 1), a method that uses a cyclone (patent document 2), and a method that uses a fluidized bed heating (patent document 3).

According to the fluidized bed heating method, the fly ash is heated by being fed into a fluidized medium bed (hereinafter simply referred to as fluidized bed) formed by a heated fluid medium (e.g., alumina of large particle diameters) thereby to decrease the content of the unburned carbon therein. In this method as described in Examples of the patent document 3, the fluidized bed is formed by using much fluid medium so that the fly ash stays in the fluidized layer for extended periods of time and, therefore, that the unburned carbon is removed highly efficiently. Further, if the fluid medium is heated and, at the same time, if the flow rate (superficial velocity in a column) of the high-temperature gas (fluidized gas) is increased in an attempted to fluidize the fly ash and discharge it from the fluidized bed, then the fly ash powder being treated can be recovered at an increased rate resulting, however, in a decrease in the efficiency for removing the unburned carbon.

PRIOR ART DOCUMENTS

Patent Documents

Patent document 1: Japanese Patent No. 6038548
Patent document 2: Japanese Patent No. 3205770
Patent document 3: Japanese Patent Laid-Open No. 2000-213709

Outline of the Invention

Problems that the Invention is to Solve

As will be understood from the above description, with the method of decreasing the content of the unburned carbon in the fly ash based on the fluidized bed heating, the unburned carbon can be removed at an improved efficiency. Moreover, the fly ash can be treated at an improved efficiency, too. However, it is difficult to improve both the efficiency for removing the unburned carbon and the efficiency for treating the fly ash at the same time. Namely, if the fly ash is permitted to stay in the fluidized bed for an extended period of time, then the efficiency for treating the fly ash decreases, as a matter of course. On the other hand, if the superficial velocity of the fluidized gas in the column is increased to improve the efficiency for treating the fly ash, then the fly ash is allowed to stay in the fluidized bed for only a short period of time resulting in a decrease in the efficiency for removing the unburned carbon.

It is also possible to cause the fly ash to stay in the fluidized bed for an increased period of time by increasing the amount of feeding the fluid medium that forms the fluidized bed. However, there is a limit in the amount of feeding the fluid medium. If the amount of feeding is increased unnecessarily, the fluid medium overflows out of the fluidized bed and gives rise to the occurrence of such problems that the fluid medium mixes into the fly ash powder that has been treated or the fluid medium is not normally fluidized in the fluidized bed.

It is, therefore, an object of the present invention to provide a process for reforming the fly ash, the process being capable of efficiently decreasing the unburned carbon contained in the fly ash.

Means for Solving the Problems

The present inventors have paid attention to the fact that the unburned carbon is contained in the fly ash in the form of particles of various sizes, that among them, the particles having smaller diameters burn in relatively short periods of time and the particles having relatively larger diameters burn in relatively long periods of time, and have succeeded in efficiently decreasing the amount of the unburned carbon contained in the fly ash.

According to the present invention, therefore, there is provided a process for reforming a fly ash by heating a raw fly ash powder that contains an unburned carbon and thereby decreasing a content of the unburned carbon, characterized in that:

a: as means for heating the raw fly ash powder, use is made of a heating unit that heats the raw fly ash powder by passing it through a heated medium-fluidized bed;

b: a high-temperature gas stream is passed through the heating unit to form the heated medium-fluidized bed and to fluidize and convey the raw fly ash powder that is thrown into the medium-fluidized bed;

c: a flow rate of the high-temperature gas stream is so set that the raw fly ash powder thrown into the heating unit is all heated in the medium-fluidized bed and is taken out from a take-out port provided at an upper part of the heating unit but that a particulate medium forming the medium-fluidized bed is not discharged from the take-out port;

d: a fly ash powder after heated and discharged from the take-out port of the heating unit is introduced into an air classifier where it is separated into a fine powder and a coarse powder;

e: a fine powder separated by the air classifier is recovered as the reformed fly ash; and f: a coarse powder separated by the air classifier is measured for its content of the unburned carbon and when the measured value is larger than a predetermined threshold value, the coarse powder is introduced again into the heating unit so as to be heated again and when the measured value is smaller than the threshold value, the powder is recovered as the reformed fly ash.

In the present invention, it is desired that:
(1) The coarse powder containing the unburned carbon in an amount that is measured to be smaller than the predetermined threshold value, is recovered by being mixed with the fine powder that is separated by the air classifier;
(2) The threshold value of the content of the unburned carbon is set to lie in a range of 0.5 to 4% by mass;
(3) A classification point of the air classifier is set to lie in a range of 50 to 150 µm; and
(4) The raw fly ash powder is heated in the medium-fluidized bed at a temperature of 600 to 1100° C.

Effects of the Invention

According to the present invention, it is made possible to continuously recover the whole amount of the raw fly ash powder that is subjected to the carbon content-decreasing treatment while decreasing the amount of the unburned carbon contained in the fly ash to a sufficient degree.

MODES FOR CARRYING OUT THE INVENTION

In the invention, the raw fly ash powder that is to be subjected to the treatment for decreasing the amount of the unburned carbon stands for the fly ashes in general that generate in the facilities that burn coal, such as coal burning thermal plants. The raw fly ash powder, further, includes the fly ashes that generate from the facilities that burn, in combination with the coal, fuels other than the coal as well as inflammable wastes. Usually, the fly ash chiefly comprises silica ($SiO_2$) and alumina ($Al_2O_3$) (these inorganic components account for 70 to 80% of the whole components) and, further, includes ferric oxide ($Fe_2O_3$), calcium oxide (CaO), magnesium oxide (MgO) and the like.

The fly ash contains the unburned carbon which is the half-burned carbon remainder, and its content amounts to about 15% by mass at the greatest. A large amount of the unburned carbon (hereinafter often described as LOI) causes a problem when the fly ash is used as a mixing material. For example, when the fly ash is mixed to a mortar or a concrete, it is highly probable that the unburned carbon floats on their surfaces and form darkened portions. It is, further, probable that the unburned carbon adsorbs chemicals such as chemical blending agents.

The invention decreases the amount of the unburned carbon by the heating by using the fluidized bed heating unit that has the medium-fluidized bed, and efficiently recovers the reformed fly ash that is obtained, i.e., efficiently recovers the fly ash that contains the unburned carbon in decreased amounts. A variety of methods have been known for measuring the amount of the unburned carbon. Examples are a method of detecting the $CO_2 \cdot CO$ gases generated by the combustion by using infrared rays, a method of measuring the ignition loss and estimating the amount of the unburned carbon from the amount of the ignition loss, a method based on the calculation of the amounts of Methylene Blue adsorption, a bulk specific gravity testing method, and a method of estimating the amount of the unburned carbon by the irradiation with microwaves. Any of the above methods can be employed in the present invention.

The amount of the unburned carbon is, hereinafter, often called LOI (loss on ignition).

Figure 1:
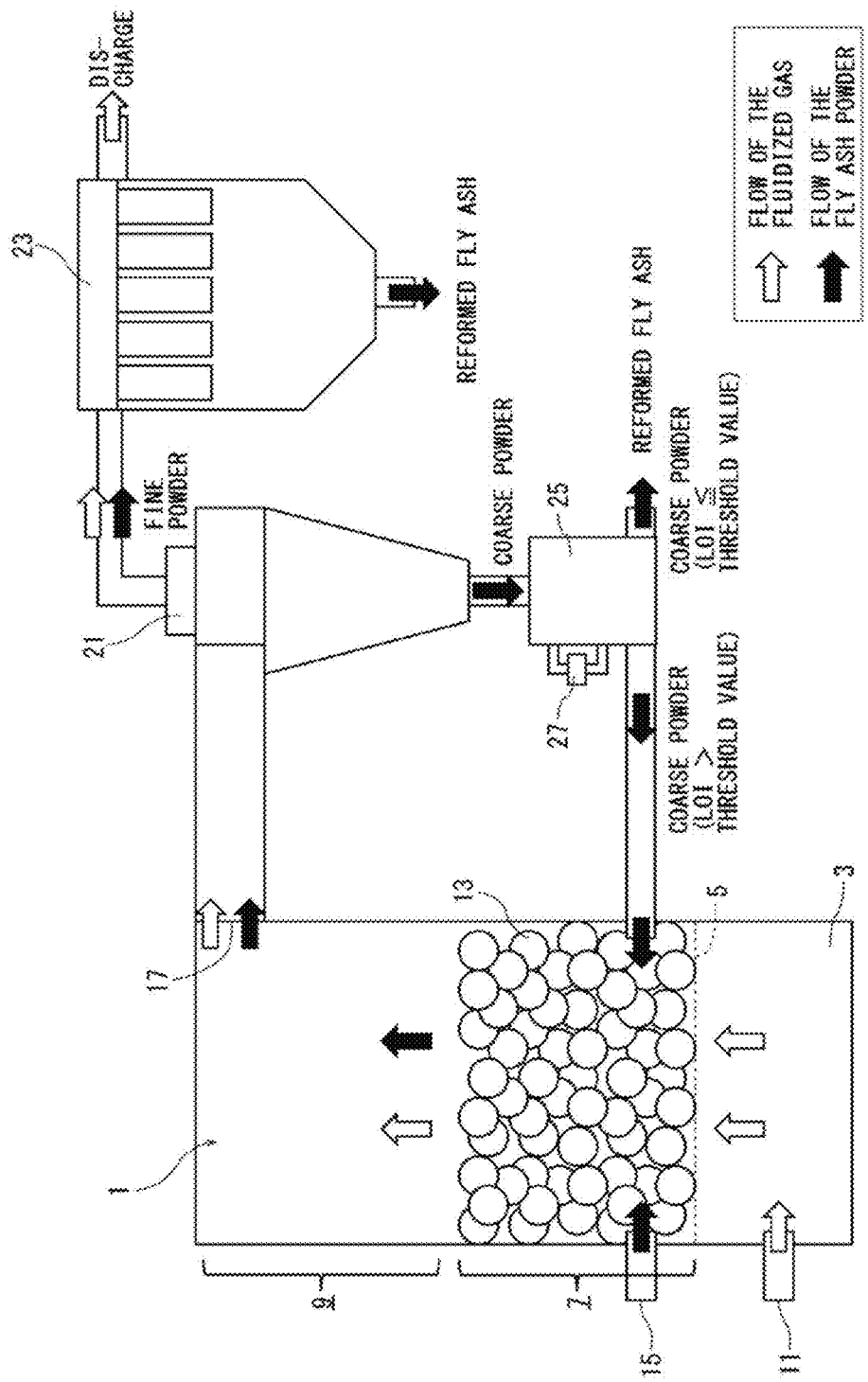
FIG. 1 It is a view schematically illustrating the flow of a process for reforming the fly ash according to the invention.

FIG. 1 illustrates a process of the present invention using a fluidized bed heating unit.

In FIG. 1, the fluidized bed heating unit generally designated at 1 has an upright cylindrical shape and is forming, upward from the lower side, a combustion chamber 3, a medium-fluidized bed 7 (hereinafter called fluidized bed) partitioned from the combustion chamber 3 by a dispersion plate 5, and a hollow head portion 9.

The combustion chamber 3 is a region where a fuel such as hydrocarbon is burned by a burner 11 to form a high-temperature gas. Oxygen in an amount theoretically required for completely burning the fuel and a gas (usually, the air) containing oxygen in an amount for burning the unburned carbon contained in the raw fly ash powder, are fed into the combustion chamber 3 together with the fuel, and are burned by the burner 11 to form a high-temperature gas. The ascending current of the high-temperature gas forms the fluidized bed 7 that is heated up to a predetermined temperature and, further, heats, fluidizes and conveys the raw fly ash powder that is fed into the heating unit 1. The high-temperature gas is hereinafter called fluidized gas.

In this embodiment, for example, it is desired to feed oxygen in an amount of 1.05 to 5.0 times as great as the amount of oxygen theoretically required for completely burning the fuel. If the amount thereof is less than 1.05 times, then oxygen is almost all consumed for burning the fuel and no oxygen is left for burning the unburned carbon.

From the standpoint of cost and safety in the invention, it is desired to use the air or nitrogen as the fluidized gas. In this case, the fluidized gas contains nitrogen in addition to containing the combustion gas (carbon dioxide, etc.) produced by the combustion of the fuel and excess of oxygen gas (surplus of oxygen gas) that was not consumed by the combustion.

In FIG. 1, white arrows indicate the flow of the fluidized gas while black arrows indicate the flow of the fly ash powder fed into the heating unit 1.

It is also allowable to produce the fluidized gas (high-temperature gas) by methods other than the method described above. For instance, a gas that is flown is heated by a method other than the combustion method, or a system is employed for heating the gas from the outer circumferential side of the heating unit by using an electric heater or flame (externally heating system).

The fluidized bed 7 is formed by a particulate medium 13 that is heated and fluidized. The raw fly ash is fed through a raw material feed port 15 formed in the lower part of the fluidized bed 7. That is, the solid particulate medium held on the dispersion plate 5 is heated and floated by the fluidized gas to thereby form the fluidized bed 7. Due to the fluidized gas, further, the raw fly ash powder is fluidized and conveyed. Here, the raw material feed port 15 has been formed in the lower part of the fluidized bed 7, and hence the raw fly ash powder introduced through the raw material feed port 15 is heated by the fluidized gas and the fluidized bed 7 to a sufficient degree.

In the upper part of the fluidized bed 7, there is formed a hollow head part 9 where no granular medium 13 is floating.

Namely, the granular medium 13 that forms the fluidized bed 7 has been so set as will not to be discharged by the fluidized gas out of the heating unit 1.

As the particulate medium 13, there is preferably used a material whose chemical composition is close to that of the fly ash, such as a particulate oxide like particulate $SiO_2$, $Al_2O_3$, $Fe_2O_3$ or Cao, or a particulate material that contains these oxides as main components so that properties of the fly ash will not be deteriorated even in case the medium is mixed into the fly ash.

It is, further, necessary that the granular medium 13 has a particle diameter larger than that of the raw fly ash powder introduced through the raw material feed port 15. This is because if the particle diameter is smaller than the particle diameter of the raw fly ash powder, then the particulate medium 13, too, is discharged out of the unit accompanying the flow of the fluidized gas. That is, it means that no hollow head part 7 is formed. Usually, the raw fly ash powder has a particle diameter of not larger than about 300 μm at the greatest while the granular medium 13 has a particle diameter of, preferably, about 0.5 to about 5 mm.

In the invention, the raw fly ash powder introduced into the fluidized bed 7 is heated upon coming in contact with the particulate medium 13 that forms the fluidized bed 7 and with the fluidized gas. Here, the temperature of heating is a temperature at which the unburned carbon burns and is, usually, 600° C. to 1100° C. and, preferably, 750° C. to 1000° C. If the temperature of heating is low, it becomes difficult to remove the unburned carbon by combustion to a sufficient degree. If the temperature of heating is unnecessarily high, on the other hand, then the fly ash may melt. Therefore, the temperature of the fluidized gas is adjusted to be so high that the raw fly ash powder is heated at the above-mentioned temperature.

The temperature of heating the raw fly ash powder can be measured by inserting a thermocouple in the fluidized layer 7 (or in the hollow head portion 9).

In the invention, the raw fly ash powder is heated by the fluidized gas of a high temperature that is fed as described above (and by the fluidized bed 7), and the amount of the unburned carbon (LOI) deceases in the raw fly ash powder. The fly ash that is heated is then discharged together with the fluidized gas through the take-out port 17 formed in the head part of the heating unit 1. That is, the rate of and the velocity of flow of the fluidized gas are so set that the raw fly ash powder introduced into the heating unit 1 is taken out in substantially the whole amount through the take-out port 17. In effect, an equilibrium state is maintained by the amount of the raw fly ash powder thrown into the heating unit 1 and by the amount of the fly ash that is heated and taken out through the take-out port 17. This, however, does not exclude such a case where a certain amount of the fly ash may stay in the heating unit 1 due to the structure or the like of the heating unit 1.

If compared in terms of the mass, the mass of the fly ash after heated and taken out through the take-out port 17 would be smaller than the mass of the raw fly ash powder by at least the amount of the carbon that has burned out.

In order to take out the fly ash in its whole amount, the amount of the fluidized gas should be suitably set depending on the form and the like of the heating unit 1 that is used. Usually, however, the amount of the fluidized gas fed into the heating unit 1 (combustion chamber 3) should be so set that a superficial velocity in the column is not less than 0.5 m/sec. Here, the superficial velocity in the column is a value obtained by dividing the amount of the fluidized gas ($m^3$/sec) by the sectional area ($m^2$) in the portion of a maximum inner diameter in the medium-fluidized bed heating unit. The amount of the fluidized gas is calculated by using values at the temperature of heating described above.

Figure 2:
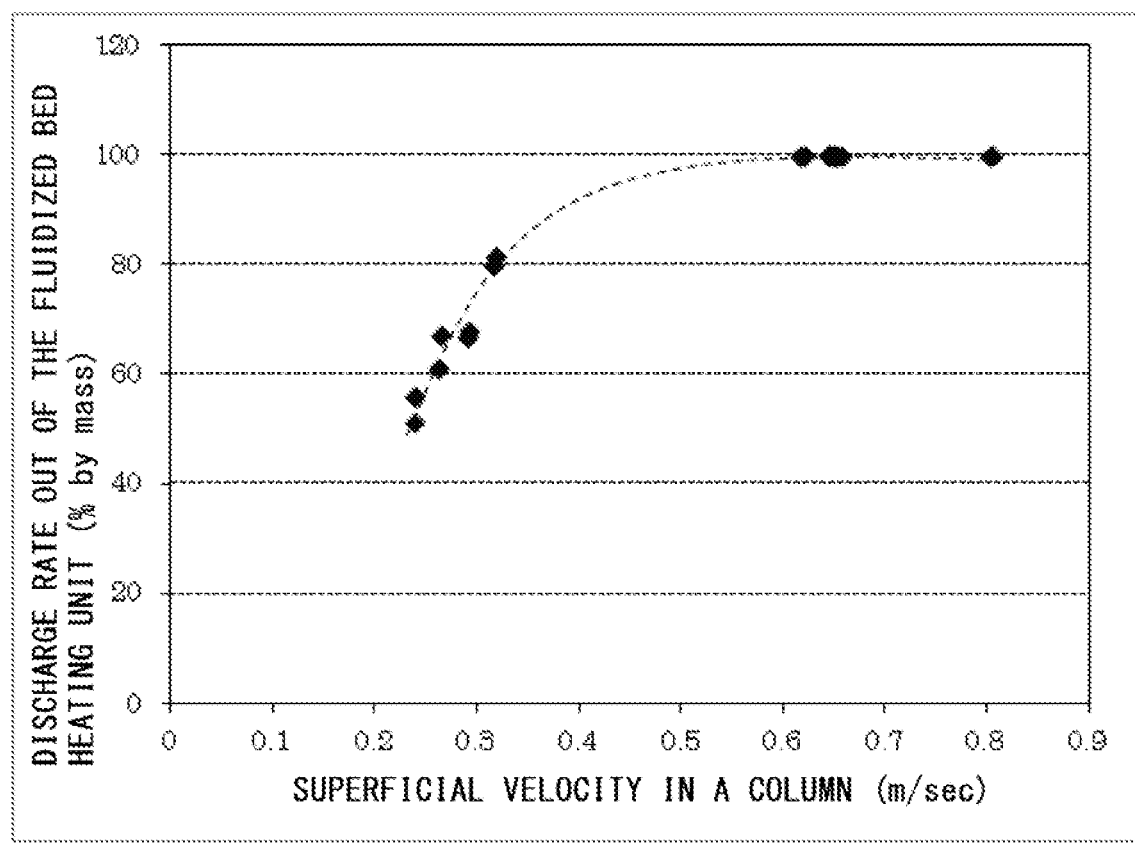
FIG. 2 It is a graph showing a relationship between the superficial velocity in a column and the discharge rate (take-out rate) out of the unit for heating the fluidized bed.

According to the present inventors, it was learned that if the superficial velocity in the column is set to be not less than 0.5 m/sec. and, preferably, not less than 0.6 m/sec., then the raw fly ash powder can be discharged in its whole amount out of the heating unit 1; i.e., the raw fly ash powder, even if it is continuously fed, does not stay in the heating unit 1 but can be discharged continuously (see the results of experiments in FIG. 2).

If the superficial velocity of the fluidized gas becomes too great in the column, then the hollow head portion 9 is not formed, and the granular medium 13 is discharged together with the fly ash through the take-out port 17. To avoid such an inconvenience, it is desired that the superficial velocity of the fluidized gas in the column is set to be, usually, about 3 m/sec. at the greatest.

Here, in the invention, the fly ash powder (fly ash after heated) discharged through the take-out port 17 of the heating unit 1 is introduced by the fluidized gas into the air classifier 21, and is classified into a fine powder and a coarse powder.

That is, in the step of heating the raw fly ash powder described above, the unburned granular carbon burns upon reacting with oxygen and extinguishes. However, the granular carbon that did not burn up, i.e., the unburned granular carbon, is discharged through the take-out port 17 together with the ash component and the fly ash powder after heated.

According to the study by the present inventors, relatively large particles of the unburned granular carbon may not burn to a sufficient degree under the above-mentioned heating conditions, and are likely to be discharged from the heating unit 1 without burned out. On the other hand, small particles of the unburned carbon mostly burn out under the above-mentioned conditions.

In the invention, therefore, the fly ash taken out from the heating unit 1 is introduced into the air classifier 21 and is separated into the fine powder and the coarse powder.

That is, from the fine powder, the unburned carbon is removed to a sufficient degree by the combustion. Therefore, the fine powder separated through the air classifier 21 is fed together with the fluidized gas to a dust collector 23 where the fluidized gas is discarded whereas the fine powder is recovered as the reformed fly ash.

The coarse powder, on the other hand, is separated from the fine powder since it is probable to contain much unburned granular carbon of large particle sizes that was not burned to a sufficient degree. The separated coarse powder is once fed into a storage silo 25 where the amount of the unburned carbon (LOI) is measured by an LOI measuring instrument 27 provided in the silo 25. When the LOI is smaller than a preset threshold value (LOI≤ threshold value), the coarse powder is recovered as the reformed fly ash. When the LOI is in excess of the preset value (LOI>threshold value), the coarse powder is returned back to the heating unit 1 (fluidized bed 7) where it is heated again to lower the LOI. Here, in case the LOI is equal to the threshold value (LOI=threshold value), the coarse powder may be returned back to the heating unit 1 to heat-treat it again, as a matter of course.

The threshold value should be suitably set depending upon the LOI required for the fly ash that is used as a mixing material for the cement and concrete. For instance, the threshold value is set to lie in a range of, preferably, 0.5 to 4% by mass and, specifically, 0.5 to 3% by mass.

The coarse powder recovered as the reformed fly ash from the temporary storage silo 25 has a low LOI. Therefore, the coarse powder can also be recovered being mixed with the reformed fly ash (fine powder) that is recovered from the above-mentioned dust collector 23, as a matter of course.

So far, study has been continued in an effort to remove the unburned carbon of large particle sizes relying on the air classification by utilizing the principle that the unburned carbon contained in the unburned carbon-containing fly ash has large particle sizes. However, the unburned granular carbon has a small specific gravity and is hence much contained in the fine powder, too. In practice, therefore, the fly ash could not be substantially separated, relying on the air classification, into the course particles and the fine particles that contain the unburned carbon in different amounts. According to the present invention, on the other hand, the fly ash is once heated and is then separated by the air. Accordingly, the unburned carbon of large particle diameters is distributed toward side of coarse particles and is introduced again into the heating unit 1 depending on the LOI of coarse particles, making it possible to efficiently reduce the content of the unburned carbon.

In the invention described above, the classification point in the air classifier is set to be in a range of, desirably, 50 to 150 μm and, specifically, 100 to 150 μm. The ratio of the unburned carbon recovered as the coarse powder increases as the classification point becomes smaller. As the classification point becomes smaller, however, it becomes more probable that even those particles that do not have to be recovered as the coarse powder are also recovered. From the standpoint of efficient operation, therefore, it is desired that the classification point is set to lie in the above-mentioned range.

No specific limitation is imposed on the air classifier 21, and there can be used, for example, an air stream classifier that utilizes a centrifugal force field, a classifier that utilizes a gravitational field or a classifier that utilizes an inertial force field.

No specific limitation is imposed, either, on the dust collector 23 that is used for collecting the fine powder classified through the air classifier 21, and there can be used anyone of any type, such as an electric dust collector, a gravity type dust collector or a centrifugal force type dust collector.

As described already, further, the LOI measuring instrument 27 provided for the temporary storage silo 25 will execute the LOI measurement relying on any known method.

EXAMPLES

The invention will now be described by the following Experimental Examples.

Experiments

There was provided a raw fly ash powder having 10.0% by mass of LOI. An average particle diameter was 44 μm while a maximum particle diameter was about 300 μm.

The raw fly ash powder was fed into the heating unit 1 shown in FIG. 1, and the fluidized gas (air) was fed at a superficial velocity in the column of 0.64 m/sec. and a heating temperature of 850° C. The raw fly ash powder was thus heat-treated and was separated into a coarse powder and a fine powder. The classification point was set to be roughly 50 μm. The fine powder and the coarse powder were recovered at a ratio of 63% by mass and 37% by mass, respectively, per the raw fly ash powder, and the sum of the fine powder and the coarse powder was 100% by mass.

The LOI in the fine powder was 1.1% by mass while the LOI in the coarse powder was 5.0% by mass. The LOI in the fine powder was low to a sufficient degree. Therefore, the fine powder could be readily used as the reformed fly ash. On the other hand, the LOI in the coarse powder was of a high level. Therefore, the coarse powder had to be heated again when it was to be used in many fields of applications.

The LOI was measured in compliance with the method of testing the loss on ignition stipulated under the JIS A 6201.

By varying the superficial velocity of the fluidized gas in the column, furthermore, the raw fly ash powder was heat-treated to measure the superficial velocity in the column and the rate of the fly ash discharged from the heating unit 1 (rate of the fly ash to the raw fly ash powder that was fed). The results were as shown in FIG. 2.

As will be learned from the results of FIG. 2, the raw fly ash powder can be almost all discharged out of the unit without staying therein provided the superficial velocity in the column is set to be not less than 0.5 m/sec. and, specifically, not less than 0.6 m/sec.

DESCRIPTION OF REFERENCE NUMERALS

1: heating unit
3: combustion chamber
5: dissipation plate
7: fluidized bed
9: hollow head part
11: burner
13: granular medium
15: raw material feed port
17: take-out port
21: air classifier
23: dust collector
25: temporary storage silo
27: LOI measuring instrument

The invention claimed is:

1. A process for reforming a fly ash by heating a raw fly ash powder that contains a unburned carbon and thereby decreasing a content of the unburned carbon, characterized in that:
   a: as means for heating the raw fly ash powder, use is made of a heating unit that heats said raw fly ash powder by passing it through a heated medium-fluidized bed;
   b: a high-temperature gas stream is passed through said heating unit to form the heated medium-fluidized bed and to fluidize and convey said raw fly ash powder that is thrown into said medium-fluidized bed;
   c: a flow rate of said high-temperature gas stream is so set that a superficial velocity in a column is not less than 0.6 m/sec. and not more than 3 m/sec. and that said raw fly ash powder thrown into said heating unit is all heated in said medium-fluidized bed and is taken out from a take-out port provided at an upper part of said heating unit but that the particulate medium forming said medium-fluidized bed is not discharged from said take-out port;
   d: a fly ash powder after heated and discharged from the take-out port of said heating unit is introduced into an air classifier where it is separated into a fine powder and a coarse powder;
   e: a fine powder separated by said air classifier is recovered as the reformed fly ash; and f: a coarse powder separated by said air classifier is measured for its content of the unburned carbon and when the measured value is larger than a predetermined threshold value, said coarse powder is introduced again into said heating unit so as to be heated again and when said measured value is smaller than the threshold value, the powder is recovered as the reformed fly ash;

wherein a classification point of said air classifier is set to lie in a range of 100 to 150 μm.

2. The process for reforming the fly ash according to claim 1, wherein the coarse powder containing the unburned carbon in an amount that is measured to be smaller than the predetermined threshold value, is recovered by being mixed with the fine powder that is separated by said air classifier.

3. The process for reforming the fly ash according to claim 1, wherein the threshold value of the content of the unburned carbon is set to lie in a range of 0.5 to 4% by mass.

4. The process for reforming the fly ash according to claim 1, wherein said raw fly ash powder is heated in said medium-fluidized bed at a temperature of 600 to 1100° C.

* * * * *